Figure 1:
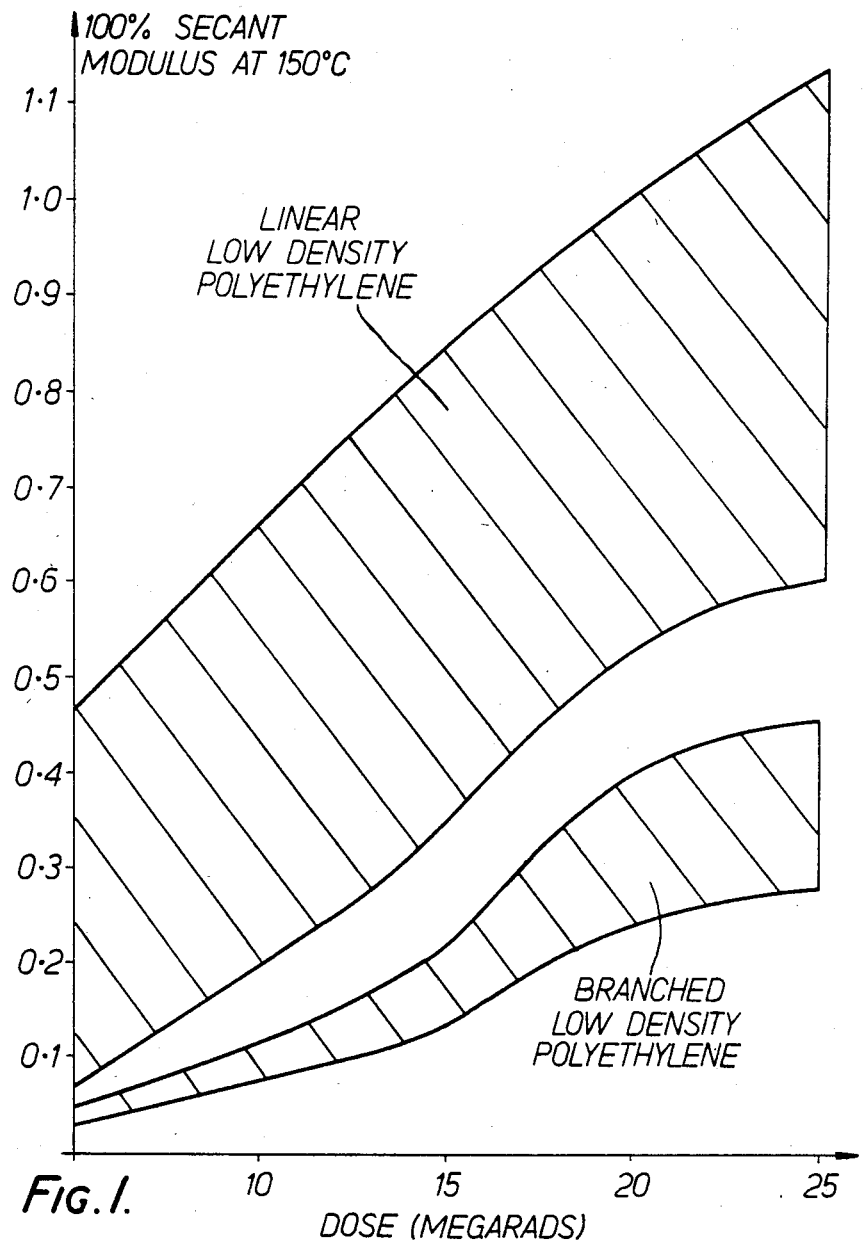

United States Patent [19]

Tamplin et al.

[11] Patent Number: 4,576,993
[45] Date of Patent: Mar. 18, 1986

[54] LOW DENSITY POLYETHYLENE POLYMERIC COMPOSITIONS

[75] Inventors: Paul Tamplin; Malcolm D. Heaven, both of Swindon, Great Britain

[73] Assignee: Raychem Limited, England

[21] Appl. No.: 574,943

[22] Filed: Jan. 30, 1984

Related U.S. Application Data

[63] Continuation of Ser. No. 237,508, Feb. 23, 1981, abandoned, which is a continuation of Ser. No. 26,950, Apr. 4, 1979, abandoned, which is a continuation-in-part of Ser. No. 25,120, Mar. 29, 1979, abandoned.

[30] Foreign Application Priority Data

Sep. 20, 1978 [GB] United Kingdom ............... 37468/78

[51] Int. Cl.[4] .............................................. C08L 23/04
[52] U.S. Cl. ................................ 525/240; 525/333.7; 525/333.8
[58] Field of Search ................... 525/333.7, 333.8, 240

[56] References Cited

U.S. PATENT DOCUMENTS

| Re. 27,158 | 8/1971 | Kehr et al. | 525/332 |
|---|---|---|---|
| 3,014,885 | 12/1961 | Jordan et al. | 525/240 |
| 3,088,848 | 5/1963 | Tritsch | 525/240 |
| 3,090,770 | 5/1963 | Gregorian | 525/240 |
| 3,183,283 | 5/1965 | Reding | 525/240 |
| 3,242,159 | 3/1966 | Kaufman | 525/333.8 |
| 3,299,194 | 1/1967 | Golike | 264/610 |
| 3,305,517 | 2/1967 | Kehr | 260/42.39 |
| 3,358,053 | 12/1967 | Hostetler | 525/240 |
| 3,592,881 | 7/1971 | Ostapchenko | 260/897 |
| 3,663,662 | 5/1972 | Golike et al. | 525/240 |
| 3,671,513 | 6/1972 | Hunt | 525/332 |
| 4,129,616 | 12/1978 | Zingheim | 525/240 |
| 4,438,238 | 3/1984 | Fukushima | 525/240 |

FOREIGN PATENT DOCUMENTS

| 853737 | 11/1960 | United Kingdom . |
|---|---|---|
| 910204 | 11/1962 | United Kingdom . |
| 998299 | 7/1965 | United Kingdom . |
| 1095772 | 12/1967 | United Kingdom . |
| 1165669 | 10/1969 | United Kingdom . |
| 1219292 | 1/1971 | United Kingdom . |
| 1267868 | 3/1972 | United Kingdom . |
| 1284082 | 8/1972 | United Kingdom . |
| 1293429 | 10/1972 | United Kingdom . |
| 1354782 | 5/1974 | United Kingdom . |
| 1355245 | 6/1974 | United Kingdom . |
| 1427670 | 3/1976 | United Kingdom . |
| 1433129 | 4/1976 | United Kingdom . |
| 1476413 | 6/1977 | United Kingdom . |

OTHER PUBLICATIONS

Technical Presentation, Pilgrim, J. T., Sclair Polyethylene Film Resins (undated).
Modern Plastics, Sep. 1978, pp. 18, 20, 98.

*Primary Examiner*—Paul R. Michl
*Assistant Examiner*—Alex H. Walker
*Attorney, Agent, or Firm*—Sheldon & Mak

[57] ABSTRACT

A cross-linked polymeric composition comprises a linear, low density ethylene homo- or copolymer which, prior to cross-linking is characterized by (a) a density at 25° C. of 0.940 gm/cm$^3$ or less (b) a linearity expressed in terms of pendant methyl groups per 10$^3$ carbon atoms of the polymeric chain of less than 30 with a substantial absence of long chain branches, and preferably (c) no more than 5 branches greater in length than C$_8$. The cross-linked polymeric composition is particularly suitable for the production of dimensionally recoverable articles, for the production of insulation material, for the production of semi-conductive or conductive polymers for use in electrical heating materials, and for the production of semi-permeable membranes.

40 Claims, 4 Drawing Figures

LOW DENSITY POLYETHYLENE POLYMERIC COMPOSITIONS

CROSS-REFERENCE

This application is a continuation of application Ser. No. 237,508, filed on Feb. 23, 1981, now abandoned, which is a continuation of application Ser. No. 26,950 filed on Apr. 4, 1979, now abandoned, which is a continuation-in-part application of Ser. No. 25,120 filed on Mar. 29, 1979, now abandoned.

The present invention relates to crosslinked polymers, especially blends of polymers, and shaped articles constructed therefrom. In particular, the present invention relates to crosslinked polyethylenes.

It is known that the properties of polymers may be considerably modified by crosslinking of the polymer chains. This is particularly true of polyethylenes which, in crosslinked form, have found important commercial applications.

The present invention is based on the finding that a certain class of polyethylenes, when crosslinked, exhibits substantial advatages.

Accordingly, the present invention provides a substantially cross-linked polymeric composition comprising a linear low density ethylene homo- or copolymer which, prior to cross-linking, is characterised by a density at 25° C. of 0.940 gm/cm$^3$ or less and a linearity expressed in terms of pendant methyl groups per 10$^3$ carbon atoms of the polymer chain of less than 30 with a substantial absence of long chain branches. For the avoidance of doubt, the term "copolymer" as employed herein is used in a broad sense to mean polymers produced from at least two different monomeric species and to include terpolymers and the like.

The ethylene homo- or copolymer preferably has a density at 25° C. prior to crosslinking of from 0.916 to 0.940 gm/cm$^3$, particularly from 0.919 to 0.940 gm/cm$^3$ especially less than 0.930 gm/cm$^3$ e.g. from 0.919 to 0.930 gm/cm$^3$.

The degree of branching of the polymeric chains prior to cross-linking is expressed in terms of the average number of pendant methyl groups per 10$^3$ carbon atoms of the ethylene homo- or copolymer chain which, as will be appreciated, is a measure of all side groups which contain a methyl group, e.g. any alkyl group and may be determined in accordance with known analytical procedures, for example the infra-red analytical technique reported by A. H. Willbourn in J. Poly. Sci 1959 34 569. Preferred polymers are those having 10 or less pendant methyl groups per 10$^3$ carbon atoms of the polymer chain and those having 15 to 30 pendant methyl groups per 10$^3$ carbon atoms of the polymer chain. Preferably the polymer contains on average less than 20 pendant methyl groups per 10$^3$ carbon atoms of the polymer chain.

The ethylene homo- or copolymers are characterised by a substantial absence of long chain branches and preferably have no more than 5 long chain branches and more preferably no more than 1 long chain branch, on average per 10$^3$ carbon atoms of the polymer chain. By long chain branches as employed herein is preferably meant branches greater in length than C$_8$ more preferably greater in length than C$_6$.

The degree of long chain branching may, for example, be established by computing the differences between the number of short branches, determined for example, by $^{13}$C nuclear magnetic resonance spectroscopy, in accordance with the method reported by M. E. A. Cuddy and A. Bunn in Polymer, 1976 Vol, 17 April page 345, and the total number of branches determined as pendant methyl groups by infra-red spectroscopy.

Of particular interest are those polymers wherein substantially all branches are C$_2$ to C$_6$ branches especially C$_2$ branches.

The linear low density ethylene homo or copolymers of the invention may be distinguished from the conventional, i.e. branched, low density polyethylenes by their higher ΔT values where ΔT as employed herein is defined as the difference in °C. between the temperature at which the polymer melts and the temperature at which the onset of crystallisation occurs. Typically ΔT values of greater than 15° C., for example 15° to 20° C. particularly 16° to 20° C., are observed in the linear low density ethylene homo or copolymers employed in the compositions of the invention.

The linear low density ethylene homo or copolymers of the invention may be characterised by their molecular weight distribution index ($\overline{M}w/\overline{M}n$) as measured by standard methods (e.g. GPC). Thus the polymers of special interest are characterised by a molecular weight distribution index of below 8 and preferably in the range 3 to 8 e.g; 3 to 7. A related parameter is the stress exponent, the polymers of interest being characterised by a stress exponent in the range 1.20 to 1.40 where stress exponent is defined as $$\frac{1}{0.477} \log_{10} \frac{\text{melt index using 6480 g at 190°C.}}{\text{melt index using 2160 g at 190°C.}}$$

A further characteristic feature of the polymers employed in the compositions in accordance with the invention is their degree of unsaturation particularly in terms of terminal vinyl groups per 10$^3$ carbon atoms of the polymeric chain, values of at least 0.2, particularly 0.2 to 1.5 for example 0.3 to 1.5 as measured for example by infra-red spectroscopy being typical.

The degree of cross-linking of the compositions may be expressed in terms of the gel content (ANSI/ASTM D2765-68). Preferably the gel content of the cross-linked compositions is at least 40%, more preferably above 50%, particularly above 65% and up to 95%, of the polymeric components of the composition.

The cross-linked compositions of the invention may be further characterised by their high elongation versus modulus performance. Thus typical elongation at break values at 150° C. exceed 300%, for example 300 to 1000%, for filled and unfilled cross-linked compositions having a 100% secant modulus at 150° C. in the range 3.5 to 4 Kg/cm$^2$ measured in accordance with ASTM D 1708-66. Preferred compositions are characterised by elongation at break values at 150° C. of at least 300%, particularly at least 500%, for example at least 600%, 700%, 800%, and often 900% for cross-linked compositions having at 100% secant modulus at 150° C. in the range 3.5 to 4 Kg/cm$^2$.

Ethylene copolymers which may be employed in the compositions of the invention are preferably low density copolymers of ethylene with olefinically unsaturated monomers polymerizable therewith. Suitable such monomers are C$_3$ to C$_{20}$, preferably C$_3$ to C$_8$, olefins, preferably α-olefins such as n-propyl-1-ene, n-but-1-ene, n-pent-1-ene, n-hex-1-ene, n-hept-1-ene and n-oct-1-ene, or olefinically unsaturated esters such as C$_2$-C$_8$ alkenyl C$_2$-C$_8$ carboxylic acid esters for example vinyl acetate and $C_1$-$C_8$ alkyl $C_3$-$C_8$ alkenoates for example ethyl acrylate. Copolymers preferably contain greater than 50 weight percent, more preferably greater than 60 weight percent, for example greater than 70 weight percent, especially greater than 85 weight percent, for example 95 to 98 weight percent, ethylene, the optimum amount depending of course on the comonomer employed.

Random, block or graft copolymers may be employed, particularly random copolymers.

Of special interest in the compositions of the invention are blends of the linear ethylene homo or copolymers with other homo- or copolymers blended prior to cross-linking. Examples of suitable homo- or copolymers which may be blended into the compositions include thermoplastic polymers, particularly other polyethylenes, for example branched low density polyethylenes especially those having at least 5 more preferably at least 10 long chain branches (e.g. greater than $C_{10}$ preferably greater than $C_{20}$) per $10^3$ carbon atoms of the polyethylene chain such as those having on average at least 5 more preferably at least 10 especially at least 15 pendent methyl groups per $10^3$ carbon atoms of the polyethylene chain (particularly those polyethylenes having at least 20 more preferably at least 40 branches greater in length than $C_{200}$ per average molecule), and a density at 25° C. below 0.940 $gm/cm^3$ for example in the range 0.910 to 0.940 $gm/cm^3$, or linear high density polyethylenes having on average less than 20 preferably less than 15, for example less than 10, especially 0.5 to 5, pendent methyl groups per $10^3$ carbon atoms of the polyethylene chain and a density at 25° C. greater than 0.940 $gm/cm^3$ for example 0.941 to 0.960 $gm/cm^3$, other polyolefins for example polypropylene, and copolymers for example ethylene/propylene copolymers and EPDM terpolymer.

Further examples of suitable blend polymers include elastomeric polymers particularly silicone elastomers as well as copolymers of ethylene with ethylenically unsaturated aliphatic esters, especially such copolymers when substantially free of halogen-containing substituents. Preferred elastomeric polymers are those exhibiting a characteristic rubber-like elastic deformability under the action of comparatively small stress the material returning substantially to its undeformed state on the removal of the applied stress, particularly those which in the uncross-linked state have an elastic modulus of $30N/mm^2$ or less, measured at room temperature in accordance with the method described in ASTM D638-72.

The preferred elastomers for use in the present invention are ethylene/acrylic ester copolymers and ethylene/vinyl acetate copolymers, especially those containing at least 3.6 moles of ethylene per 1000 grams of polymer. Examples of suitable elastomers include:
(a) An ethylene/alkyl acrylate or ethylene/alkyl methacrylate copolymer, wherein the alkyl group has 1–4 carbon atoms; the proportion of the acrylic ester being about 2.5–8.0 moles of ester groups per kilogram of the copolymer.
(b) A terpolymer of ethylene with an alkyl acrylate or methacrylate wherein the alkyl group has 1–4 carbon atoms and a third copolymerizable monomer, which may be, for example one of the following:
  (i) a $C_1$-$C_{12}$ alkyl monoester or diester of a butenedioic acid,
  (ii) acrylic acid,
  (iii) methacrylic acid,
  (iv) carbon monoxide,
  (v) acrylonitrile,
  (vi) a vinyl ester,
  (vii) an alkyl acrylate or alkyl methacrylate, the alkyl group having at least five carbon atoms; and
  (viii) maleic anhydride; or
(c) Ethylene/vinyl acetate copolymers especially those containing at least 35% by weight vinyl acetate.

In the above terpolymer the proportion of the acrylic ester is equivalent to about 2.5–8.0 moles of ester groups per kilogram of the polymer, and the proportion of the third monomer is no higher than about 10 weight percent of the polymer.

The elastomer can be a simple copolymer of ethylene with methyl acrylate, ethyl acrylate, propyl acrylate isopropyl acrylate, a butyl acrylate, methyl methacrylate, ethyl methacrylate, propyl methacrylate, isopropyl methacrylate, a butyl methacrylate or vinyl acetate. Such copolymers that are not commercially available can be made by conventional and well known methods. These copolymers preferably have a melt index within the range of 0.1–70 at 190° C., more preferably 0.5–15 as measured by ASTM method number D-1238-52T, or the substantially equivalent method ASTM D-1238-73.

The terpolymer of ethylene with an acrylic ester and a third monomer may contain as the third monomer an ester or half ester of fumaric acid or maleic acid, wherein the alcohol moiety can be, for example, methyl, ethyl, propyl, isopropyl, various isomers of butyl, pentyl, hexyl, heptyl, octyl, nonyl, decyl, undecyl, dodecyl and the like. The third monomer may also be, among others, a vinyl ester such as, for example, vinyl acetate or vinyl butyrate. It can also be an acrylic ester such as, for example, various isomeric forms of pentyl, hexyl, heptyl, octyl, nonyl, decyl, undecyl, dodecyl, pentadecyl and octadecyl acrylate and methacrylates. It is not practical to use as the third monomer an acrylic ester in which the alcohol moiety contains more than 18 carbon atoms.

Excellent results have been obtained using as the elastomer component of the polymer composition of a terpolymer of ethylene, methyl acrylate and a cure-site monomer comprising carboxyl groups available from Du Pont under the trade name Vamac.

Physical properties and other details concerning this material are to be found in a brochure available from Du Pont entitled "Vamac ethylene/acrylic Elastomers—A new Class of Heat & Oil Resistant Rubber" by J. F. Haymon, R. E. Fuller, W. K. Witsiepe and R. N. Greene under reference BA-0002, the disclosure of which is incorporated herein by reference, corresponding essentially to articles appearing in Rubber Age, May 1976, and De Nederlands Rubberindustrie No. 7177.

Mixtures of any of the above mentioned elastomers with each other or with other elastomers may be used where appropriate although it has been found that the presence of hydrocarbon elastomers has a deleterious effect upon the oil resistance of the polymer composition and thus these are preferably not included, or if present, are preferably incorporated in an amount of not more than 5% by weight based on the total weight of the polymer composition.

It is believed to be advantageous for the solubility parameter of the elastomer to be greater than 9, and, in advantageous compositions according to the invention, it is further preferred that the solubility parameters of the polymeric components of the blend should be similar, e.g. they will differ by not more than 0.5, preferably by not more than 0.25.

For the purpose of this specification, solubility parameter is defined as that measured by the method of Brandrup & Immergut, Polymer Handbook Chapter 4 page 340 (2nd Edition) and is expressed as $(cals/cm^3)^{\frac{1}{2}}$.

Some types of polymer materials inherently have a solubility parameter greater than 9 whereas others can have solubility parameters greater than or less than 9 depending on their precise chemical composition. Still others, of course, have solubility parameters which are inherently less than 9.

The cross-linked polymeric compositions of the invention which have been derived from blends of linear low density homo or copolymers with thermoplastic or elastomeric homo- or copolymers offer various unforeseen advantages and are accordingly of special interest. Thus reduced hot creep and hot tension set phenomena are typically exhibited by the blend compositions, particularly the blends with other polyethylenes, considerably facilitating moulding of the compositions. In addition cross-linking may be more readily achieved, particularly the blends with other polyethylenes such as branched low density polyethylenes, for example after incorporating from 5 to 50 weight percent of the blend polymer. The blend polymers frequently offer increased thermal ageing and resistance to hydrocarbon fluid particularly where the solubility parameter of the blend component exceeds 9, for example blends with elastomers such as ethylene/vinyl acetate.

Preferably the weight ratio of the blended polymeric component or components to the linear low density ethylene homo- or copolymer in the composition lies in the range 0 to 20:1 particularly 0 to 1:1, more preferably 0 to 0.5:1, especially 0 to 0.2:1, for example 0 to 0.15:1 respectively.

The preferred blends have a density at 25° C. below 0.960 gm/cm$^3$, especially below 0.940 gm/cm$^3$ with branched low density polyethylenes. In some cases blends with a density at 25° C. of below 0.925 gm/cm$^3$ exhibit particularly interesting properties especially high elongation at break versus 100% secant modulus at 150° C. properties.

Particularly interesting linear low density ethylene homo or copolymers, including blends, are the resins commercially available from E. I. Du Pont de Nemours (Canada), Corruna, Ontario under the trade name "Sclair" and in particular the resins listed below in Table 1 under type reference.

| Du Pont Sclair Type Reference | Density gm/cm$^3$ at 25° C. | Melt Index | Stress Exponent |
|---|---|---|---|
| 8405 | 0.937 | 2.7 | 1.26 |
| 11D-1 | 0.919 | 0.60 | 1.40 |
| 11W | 0.919 | 0.70 | 1.37 |
| 11S | 0.920 | 1.40 | 1.35 |
| 11U | 0.9215 | 1.40 | 1.35 |
| 11Y | 0.924 | 5.1 | 1.26 |
| 2107 | 0.924 | 5.1 | 1.26 |
| 8107 | 0.924 | 5.1 | 1.26 |
| 2108UV1 | 0.924 | 8.5 | 1.26 |
| 2109 | 0.924 | 10.0 | — |
| 2113 | 0.924 | 29.0 | — |
| 2114 | 0.924 | 53.0 | — |
| 8307 | 0.930 | 5.0 | 1.26 |
| 8305 | 0.932 | 3.0 | 1.26 |
| 44F | 0.935 | 1.5 | 1.67 |
| 15B | 0.939 | 0.35 | 1.69 |
| 8506 | 0.940 | 3.8 | 1.26 |
| 8109 | 0.921 | 12.0 | 1.26 |
| 8309 | 0.930 | 12.0 | 1.26 |
| 2316 | 0.930 | 73.0 | — |
| 8507 | 0.940 | 5.0 | 1.26 |
| 2514 | 0.940 | 45.0 | — |
| 2914 | 0.922 | 50.0 | — |
| 8105 | 0.922 | 2.7 | — |

Examples of linear low density polyethylene homo- or copolymers including blends of special interest are further characterised in Table 2.

TABLE 2

| Du Pont Sclair Type Ref | Degree of Crystallinity % | Pendant Methyl groups per 10$^3$ C atoms | Short Chain branches per 10$^3$ C atoms | No. of double bonds per 10$^3$ C atoms | | |
|---|---|---|---|---|---|---|
| | | | | trans vinylene | terminal vinyl | pendant methylene |
| 8107UV1 | 44 | 7 | ≧7 | 0.23 | 0.48 | 0.09 |
| 8307 | 64 | 11 | ≧11 | 0.19 | 0.55 | 0.08 |
| 8305 | 58 | 9 | 9C$_2$ | 0.16 | 0.48 | 0.07 |
| 8105 | 47 | 17 | 16C$_2$ | 0.16 | 0.46 | 0.09 |
| 8705 | 69 | 4 | 1-2C$_2$ | 0.08 | 0.53 | 0.06 |
| 8405 | 65 | 7 | ≧7 | 0.11 | 0.52 | 0.07 |
| 11D-1 | 46 | 17 | 17C$_2$ | 0.26 | 0.49 | 0.09 |
| 11W | 53 | 27 | ≧27 | 0.23 | 0.23 | 0.12 |

Examples of other linear low density polyethylenes are those commercially available from Gulf Oil under the Gulf type references set out in Table 3.

TABLE 3

| Gulf Type Reference | Density gm/cm$^3$ at 25° C. | Melt Index | Pendent Methyl groups per 10$^3$ C atoms |
|---|---|---|---|
| Gulf 9633 | 0.932 | 0.13 | 2 |
| Gulf 9636 | 0.935 | 0.87 | 3.5 |

For most purposes, it is preferred that the compositions incorporate at least 10 weight percent filler, either reinforcing fillers (e.g. of particle size from 0.01 to 1 micron) or non-reinforcing fillers (e.g. of particle size from 1 to 120 microns). It is generally found that a higher degree of reinforcement is secured by the use of reinforcing fillers such as high surface area carbon blacks or silicas than would be obtained with other types of polyethylenes and that usually no significant detriment to physical properties are observed with non-reinforcing fillers such as calcium carbonate or thermal black, as would be observed in other types of polyethylenes.

The compositions of the invention may include other additives, such as stabilizers, for example UV stabilisers and antioxidants, flame retardants, anti-tracking fillers and pigments, the nature and amounts of additives included depending naturally on the specific use for which the compositions are intended.

The compositions of the invention may be produced in conventional manner e.g. by milling the components in a Banbury mixer. They may then be processed into shaped articles e.g. by extrusion or moulding. Shaped articles so produced also form part of the present invention. When it is proposed to cross-link the compositions of the invention in the solid state, e.g. by exposure to ionising radiation, preferably the compositions are quenched after the hot shaping stage, at least across the crystalline melting point of the composition. Preferably quenching rates of at least 5° C./sec, e.g. at least 10° C./sec, more preferably at least 20° C./sec and in the case of thin articles such as films advantageously at least 100° C./sec, are employed. Quenching may be achieved by contacting the shaped article with a heat exchange fluid such as water. It has been found that quenching achieves a decrease in crystallinity and thereby an increase in modulus e.g. 2% secant modules, in the cross-linked material.

Cross-linking preferably takes place at or subsequent to the shaping stage, depending on the manner of cross-linking and the nature of the shaped article. It may be effected by the incorporation of from 0.2 to 5 weight percent of a cross-linking agent such as a free radical initiator for example an organic peroxide, such as dicumyl peroxide or 2,5-di-(t-butyl-peroxy)hexane, alone or in combination with a cocuring agent such as a polyfunctional vinyl or allyl compound, for example triallyl cyanurate, triallyl isocyanurate or pentaerythritol tetramethacrylate. One preferred mode of chemically cross-linking involved grafting a hydrolysable silane or silane derivatives e.g. an alkoxysilane such as vinyl trimethoxysilane to the polyethylene base structure and subsequently hydrolysing to effect cross-linking by silanol condensation in manner known per se. Catalysts may be employed to facilitate silanol condensation e.g. organotin catalysts such as dibutyltindilaurate.

Alternatively, cross-linking may be effected by exposure to high energy irradiation such as an electron beam or γ-rays. Dosages in the range 2 to 80 Mrads, preferably 5 to 50 Mrads, e.g. 8 to 20 Mrads are appropriate. For the purposes of cross-linking by irradiation, preferably from 0.2 to 5 weight percent or a pro-rad such as a poly-functional vinyl or allyl compound, for example triallyl cyanurate or triallyl isocyanurate are incorporated into the composition prior to the cross-linking treatment.

The above mentioned non-cross-linked compositions incorporating an effective amount of a cross-linking agent or prorad are new and also form part of the present invention.

The compositions of the present invention are particularly suitable for the production of dimensionally recoverable articles, that is to say, articles, the dimensional configuration of which may be made substantially to change when subjected to an appropriate treatment. Of particular interest are heat recoverable articles, the dimensional configuration of which may be made substantially to change when subjected to heat treatment. Heat recoverable articles may be produced by deforming a dimensionally heat stable configuration to a heat unstable configuration, in which case the article tends to assume the original heat stable configuration on the application of heat alone. As is made clear in U.S. Pat. No. 2,027,962, however, the original dimensionally heat stable configuration may be a transient form in a continuous process in which, for example, an extruded tube is expanded, whilst hot, to a dimensionally heat-unstable form. Alternatively a preformed dimensionally heat stable article may be deformed to a dimensionally heat-unstable form in a separate stage. In the production of dimensionally recoverable articles, the composition may be cross-linked at any stage in the production process that will accomplish the desired dimensional recoverability e.g. prior to the shaping of the dimensionally unstable configuration. One manner of producing a heat recoverable article comprises shaping the pre-cross-linked composition into the desired heat stable form subsequently cross-linking the composition, heating the article to a temperature above the crystalline melting point of the composition, deforming the article and cooling the article whilst in the deformed state so that the deformed shape of the article is retained. In use, since the deformed state of the article is heat unstable, application of heat will cause the article to assume its original heat stable shape. Such dimensionally recoverable articles may be employed as sleeves for covering and sealing splices and terminations in electrical conductors, for environmentally sealing damaged regions or joints in utility supply systems, e.g. gas or water pipes, district heating systems, ventilation and heating ducts and conduits or pipes carrying domestic or industrial effluent.

The compositions of the present invention are also particularly suitable for the production of insulation material, particularly jacketing materials for wires and cables. Such materials may be produced in conventional manner, for example by extrusion onto conductors to form wires or onto wires to form cables with simultaneous or subsequent cross-linking.

They are also useful as high voltage insulation incorporating an anti-tracking filler such as alumina trihydrate especially to achieve an initial tracking voltage according to ASTM D2303 of greater than 2.5 kV and/or when including as a blend component, in the linear low density ethylene homo- or copolymer, silicone elastomers or ethylene copolymers. Suitable antitracking fillers and blendable silicone elastomers and ethylene copolymers are described by R. J. Penneck and R. J. T. Clabburn in "Heat Shrinkable Cable Termination System for High Voltage Cables" Proc. 10th Electrical Insulation Conference, Chicago USA Sept. 20-23 1971, page 292-297 and in UK Pat. Nos. 1,303,432 and 1,137,952 the contents of which are incorporated herein by reference.

Furthermore, by the incorporation of appropriate fillers, e.g. carbon black, the compositions may be rendered semiconducting or conducting and in such form are particularly suitable as semi-conductive or conductive polymers for use in electrical heating materials, e.g. in the form of heating tapes, strips or panels, in the electrical screening of electrical power cables or in the electrical stress relief of splices and termination in high voltage electric cables.

Another important application of the cross-linked compositions of the invention is in the production of semi-permeable membranes. For such use the compositions of the invention are produced in film form preferably with a film thickness of less than 1.0 mm, more preferably in the range 0.001 to 0.5 mm. The film is also preferably grafted with monomers designed to modify the selectivity of the membrane to vary the permeability thereof to various ionic species. Examples of graftable monomers include olefinically unsaturated acids or derivatives thereof, particularly methacrylic and acrylic acids. Such grafting may be accomplished in known manner by subjecting the film to high energy radiation, e.g. to an electron beam, U.V. or γ-radiation in the presence of the monomeric species to be grafted. The film may be in non-cross-linked form prior to exposure to the radiation such that the radiation treatment serves also to cross-link the composition. Preferably, however, the film is cross-linked prior to grafting to achieve better ion-selectivity.

Membranes produced in accordance with the invention are particularly useful as separators in electrochemical processes, for example as separators in electrolytic cells and particularly batteries such as Ag/Zn, Hg/Zn, Ni/Cd and Ni/Zn cells. Such membranes possess several advantages such as longer service life in electrolytic cell environments, improved wet strength and lower swelling tendency than conventional polyethylene membranes.

The compositions are particularly useful in any of the above applications in view of their notable ability to accept loadings of additives, particularly fillers, e.g. 10 weight percent or more, without detriment to the properties of the composition, their notable mechanical properties in cross-linked form, e.g. elongation at break, hot modulus, abrasion resistance and tensile strength, and/or their chemical resistance, e.g. to solvents, particularly organic solvents such as oil and petroleum jelly.

The invention is illustrated by the following examples wherein parts and percentages are by weight and temperatures are in °C.

EXAMPLE 1

Chemically cross-linked systems

Various cross-linked compositions are produced by milling the ingredients of each formulation (see below) together on a twin roll mill to form a hide. The hides are pressed into uniform plaques and cured at 200° C. for 10 minutes. The ingredients of the various formulations employed are set out below:

| FORMULATION 1 | % |
| --- | --- |
| Sclair 8405 | 61.75 |
| Whiting G400 (ground calcium carbonate) | 30.00 |
| Zinc stearate | 1.50 |
| Maglite D (high surface area magnesium oxide commercially available from Merck Chemicals Inc) | 1.50 |
| Irganox 1010 pentearithritol tetrakis - 3-(3,5-di-tert-butyl-4-hydroxy phenyl)-propionate, antioxidant commercially available from Ciba Geigy A.G. | 1.25 |
| Triallyl cyanurate | 0.20 |
| Varox 2,5-dimethyl-2,5-di-(tert- | 0.80 |

| FORMULATION 1 | % |
| --- | --- |
| butyl-peroxy)hexane | |

| FORMULATION 2 | % |
| --- | --- |
| Sclair 8105 | 55 |
| Elvax 360 (an ethylene/vinyl acetate copolymer containing 25% vinyl acetate commercially available from Du Pont de Nemours) | 15 |
| Whiting G400 | 21.5 |
| Maglite D | 1.5 |
| Vulcan 9 | 2.7 |
| Irganox 1010 | 1.25 |
| Zinc stearate | 1.75 |
| Triallyl cyanurate | 0.30 |
| Varox | 1.00 |

| FORMULATION 3 | % |
| --- | --- |
| Sclair 8305 | 55 |
| Elvax 360 | 15 |
| Whiting G400 | 21.5 |
| Maglite D | 1.5 |
| Vulcan 9 | 2.7 |
| Irganox 1010 | 1.25 |
| Zinc stearate | 1.75 |
| Triallyl cyanurate | 0.30 |
| Varox | 0.80 |

The tensile properties of the resultant plaques are set out below and determined by standard test methods:

| Tensile Property | Formulation 1 | Formulation 2 | Formulation 3 |
| --- | --- | --- | --- |
| 100% Secant modulus 150° C. | 5.6 | 4.8 | 4.8 |
| Tensile strength 150° C. | 7.5 | 6.0 | 8.5 |
| Elongation at break 150° C. | >450 | >420 | >450 |
| Tensile strength 23° C. | 220 | 230 | 214 |
| Elongation at break 23° | >500 | >500 | >500 |

EXAMPLE 2

Chemically cross-linked systems

The following formulations A and B were melt extruded at 195° at which temperature grafting of the silane onto the polyethylene base structure is initiated via the decomposition of the peroxide.

Formulation A 80 parts: Sclair 8105
20 parts: DYNH-3 (trade name—a branched low density polyethylene available from Union Carbide)
2 parts: Vinyltrimethoxysilane
0.1 parts: Dicumyl peroxide Formulation B 100 parts: DYNH-3
2 parts: Vinyltrimethoxysilane
0.2 parts: Dicumyl peroxide The resulting material was cooled and pelletised.

The following formulation C was also melt extruded and pelletised:

Formulation C 100 parts: DYNH-3
1 part: Dibutyltindilaurate
2 parts: Santanox R (trade name—an antioxidant available from Monsanto Ltd)

95 parts of pelletised formulation A were blended with 5 parts of pelletised formulation C and injection moulded into short tube sections. The resulting tube sections were allowed to cool, and then immersed in water at 80° for 24 hours. The procedure was repeated for a blend of formulations B and C.

The materials produced from formulation A were found to possess substantially superior elongation at 150° than those produced from formulation B.

EXAMPLE 3

Radiation cross-linked systems

Figure 2:
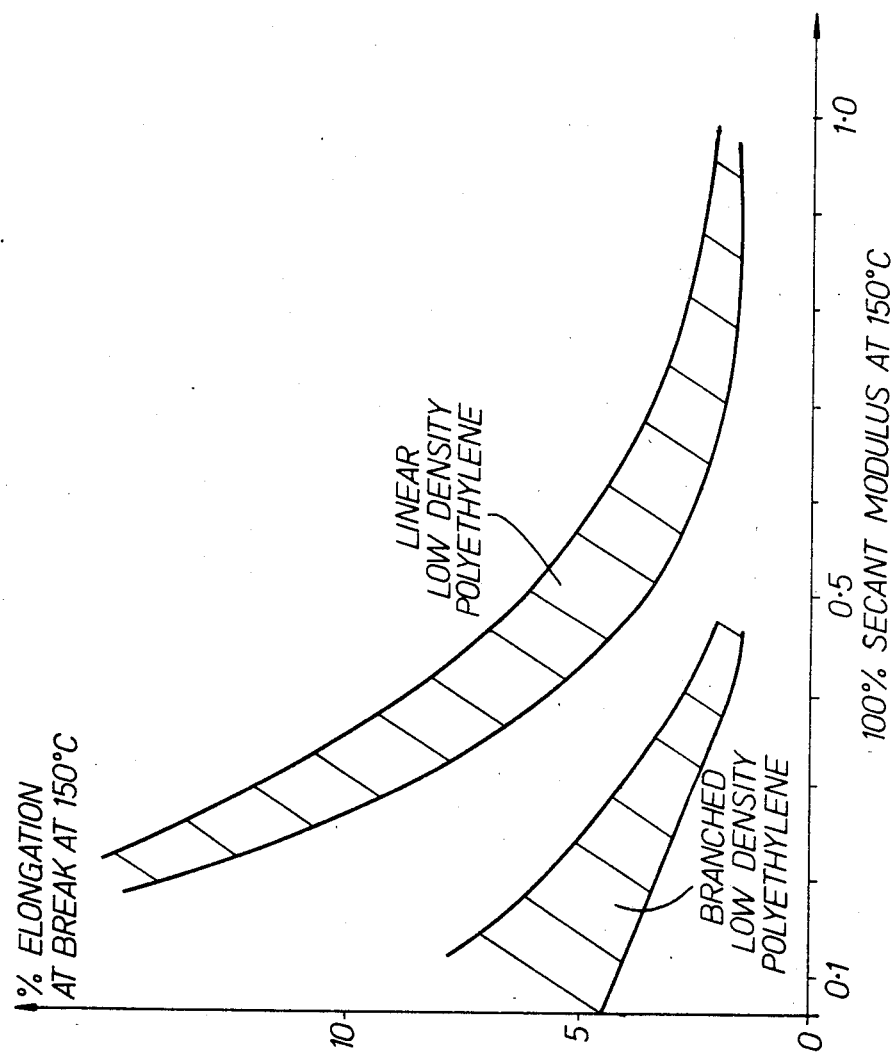

Plaques are made up in analogous manner to that described in Example 1 from commercial grade Sclair linear low density polyethylenes (11W, 11D, 8105, 8305 and 8405) and Gulf 9633 and 9636 linear low density polyethylenes in the absence of any additive other than any already present in the commercial grade product. Instead of the heat cure step of Example 1, the plaques are exposed to electron beaming at radiation dosages of 10, 15, 20 and 25 Mrads. Thereafter, the various plaques are examined to determine their 100% secant modulus at 150°. For comparison purposes, the procedure was repeated with the following commercially available branched low density polyethylenes i.e. DYNH-3, PN220 (BXL) and CARLONE 30-002BA (Shell). The results are set out graphically in FIGS. 1 and 2 and define two envelopes, one characteristic of the linear low density polyethylenes and the other characteristic of the branched low density polyetheylenes. These figures demonstrate the greater ability of the linear low density polyethylenes to crosslink at any given radiation dosage than the branched low density polyethylenes (FIG. 1) and the superior hot properties of the cross-linked linear low density polyethylenes than the cross-liked conventional branched low density polyethylenes (FIG. 2).

EXAMPLE 4

The procedure of Example 3 is repeated incorporating 0.2% of triallyl cyanurate as prorad in each product prior to cross-linking. Results are slightly improved over those obtained in Example 3.

EXAMPLE 5

Figure 3:
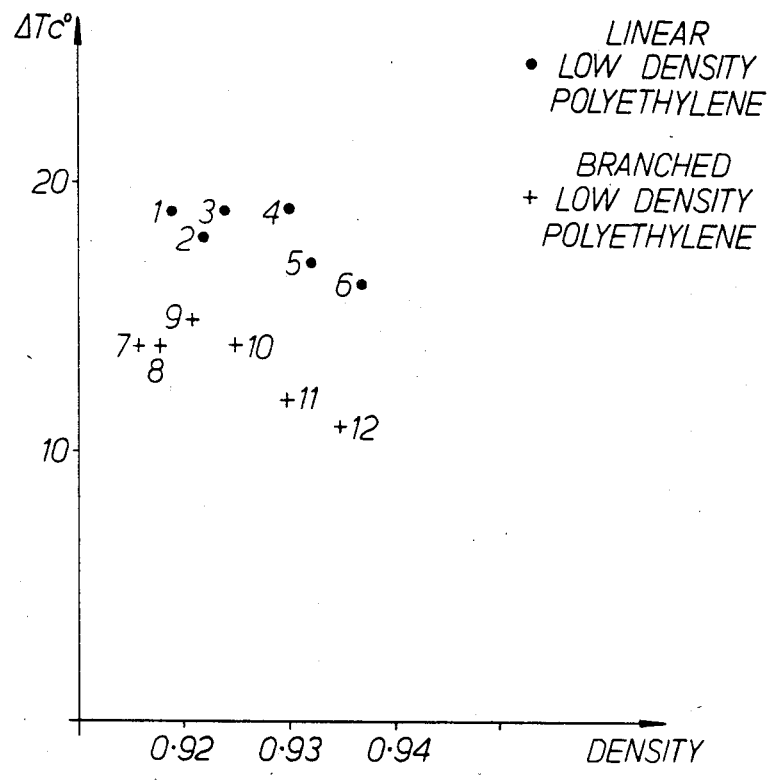

In order to demonstrate how ethylene homo and copolymers employed in the compositions of the invention are distinguished from branched low density polyethylenes, accompanying FIG. 3 shows a plot of AT $(T_m - T_c)$ versus density at 25° C. values for the linear low density Dupont Sclair resins 11W[1], 8105[2], 8107[3], 8305[5] and 8405[6] against commercially available branched low density polymers DYNH-3[7] (Union Carbide), PN 220[8] (BXL) Carlona 25-002GA[9] (Shell), Carlona 30-002BA[10] (Shell), EXXON LT-117[11] (EXXON) and Gulf 2604M[12] (Gulf Oil), the materials being represented on the Figure by the superscripts 1 to 12.

EXAMPLE 6

Figure 4:
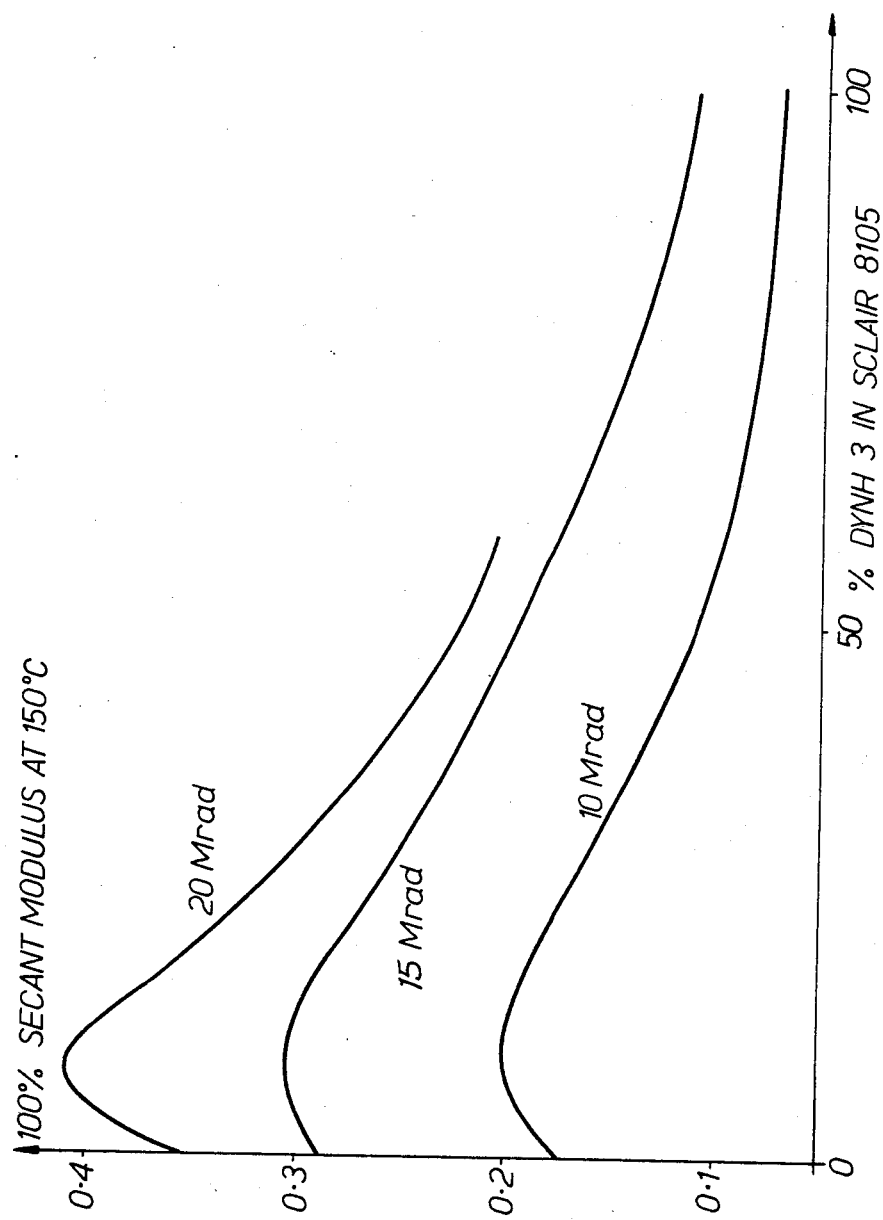

Example 3 is repeated at radiation dosages of 10, 15 and 20 Mrads or plaques made up from blends of commercial grade Sclair linear low density polyethylenes with varying amounts of a conventional branched low density polyethylene and the 100% secant modulus at 150° C. determined for each plaque. The results are shown graphically in FIG. 4 indicating a synergistic effect in 100% secant modulus properties at 150° for cross-linked mixtures of linear and branched low density polyethylenes.

EXAMPLE 7

Heat Shrinkable Sleeve

A formulation of the following composition:
Sclair 8405: 62.55 parts
Whiting G400: 30.00 parts
Vulcan 9: 3.00 parts
Zinc stearate: 1.50 parts
Maglite D: 1.50 parts
Irganox 1010: 1.25 parts and
Triallyl cyanurate: 0.20 parts
is formed into tubing in a laboratory extruder under the following operating conditions:
barrel temperature zone 1: 120°–130°
barrel temperature zone 2: 130°–140°
die temperature: 140°–150°
die diameter: 25±1 mm
wall thickness: 1±0.01 mm
haul off speed: 0.4 meters/minute The extruded tubing is subjected to a dosage of 10 Mrads electron beaming in an electron accelerator and then cut into 20 cm lengths. Each length is expanded after heating, on a former to give 500% expansion as measured by change in wall thickness. The resulting heat shrinkable product is suitable for shrinking onto a substrate of from 26 to 120 mm diameter without danger of splitting. The example is repeated with the additional stage of quenching the extruded tube by immersion in water as soon as it leaves the extruder thereby achieving an increase in modulus of the material after cross-linking.

EXAMPLE 8

Heat Shrinkable Sleeve

The procedure of Example 7 is repeated employing the following formulation.

|  | Parts |
| --- | --- |
| Sclair 8105 | 39.98 |
| Commercially available ethylene/vinyl acetate copolymer containing 25% vinyl acetate melt flow index 2 | 15.99 |
| Commercially available branched low density polyethylene - density at 25° C. 0.918 and melt flow index 0.1 | 19.49 |
| G400 Whiting | 13.00 |
| Maglite D | 1.5 |
| Zinc Stearate | 1.0 |
| Irganox 1010 | 1.25 |
| Vulcan 9 | 6.49 |
| Triallyl cyanurate | 0.30 |
| Varox | 1.00 |
|  | 100.00 |

The sleeve so produced could be expanded to greater than 600% without exhibiting split sensitivity and in addition an excellent balance of properties is achieved. Typical properties are set out below.
150° C. Properties 100% secant modulus: 0.35–0.40 MPa
Tensile strength: 0.95 MPa
Elongation: >430%
Room Temperature Properties
  Tensile strength: 24.5 MPa
  Elongation: 590%
  2% Secant modulus: 130.0 MPa
−40° C. Properties
  Tensile strength: 29.0 MPa
  Elongation: 365%
Heat Ageing (168 hours at 150° C.)
  Tensile strength: 22.4 MPa
  Elongation: 525%
Solvent Resistance (168 hours Petroleum Jelly 70° C.)
  Tensile strength: 18.5 MPa
  Elongation: 532%
Electrical Properties
  Electrical strength: 161 Kv/cm
  Permativity: 3.14
  Volume Resistivity: $7.7 \times 10^{13}$ ohm cm
Water Uptake: 0.21%
Specific Gravity: 1.057 g/cm$^3$

EXAMPLE 9

Semi-conductive Heat Shrinkable Sleeve

The procedure of Example 7 is repeated employing a formulation of the following composition
  Sclair 8105: 61.55 parts
  Thermax (trade name—a thermal carbon black available from Vanderbilt Ltd): 30.00 parts
  Zinc stearate: 1.50 parts
  Maglite D: 1.50 parts
  Irganox 1010: 1.25 parts
  Triallyl cyanurate: 0.20 parts The resulting semi-conductive heat shrinkable tube may be employed in the stress grading of the termination in a screened high voltage cable.

EXAMPLE 10

Conductive Heat Shrinkable Sleeve

The procedure of Example 7 is repeated employing the following formulation

| | |
|---|---|
| Sclair 8105 | 51.70 |
| Commercially available ethylene/vinyl acetate copolymer containing 25% vinyl acetate - melt flow index 2 | 17.25 |
| Ketjen EC (trade name - a conductive carbon black available from AKZO Ltd) | 17.00 |
| Thermax | 6.65 |
| Zinc stearate | 2.00 |
| Maglite D | 1.50 |
| Agerite resin D | 1.50 |
| Triallyl cyanurate | 0.40 |
| Luperox 130 (trade name - a peroxide available from Luperco) | 1.00 |
| Lead fumarate | 1.00 |
| | 100.00 |

The conductive sleeve so produced possesses an excellent balance of properties, allowing its use as a screen for electrical cables, typical properties being set out below Room Temperature
  Tensile strength (MPa): 19.57
  Elongation (%): 325
150° C.
  Tensile strength (MPa): 2.3
  Elongation (%): 365
  100% secant modulus (MPa): 0.8
Heat Shock: 4 hrs @ 200° C.
  Elongation (%): 275
Heat ageing: 7 days @ 150° C.
  Elongation (%): 225
Solvent Resistance: days
  Transformer Oil:
  Elongation (%): 270
Specific Gravity: 1.086
Volume Resistivity (ohm cm): 6.0

EXAMPLE 11

High Voltage Anti-tracking Sleeve

The procedure of Example 7 is repeated employing the following high voltage anti-tracking insulation formulations:

| Component | Formulation 1 Parts | Formulation 2 Parts |
|---|---|---|
| Sclair 8105 | — | 23.10 |
| DPD 6169 (Trade name - an ethylene/ethyl acrylate copolymer available from Union Carbide) | 22.73 | 22.73 |
| Silastic 437 (Silicone elastomer available from Dow Corning) | 22.73 | 22.73 |
| Alumina trihydrate | 24.99 | 24.99 |
| Ferric oxide | 3.79 | 3.79 |
| Agerite Resin D | 1.52 | 1.52 |
| Triallyl cyanurate | 0.76 | 0.60 |
| 2,5-bis-tert-butyl-peroxy-2,5-dimethyl hexyne | 0.76 | 0.55 |
| DYNH-3 | 22.73 | — |

The sleeves so produced were found to have the following properties.

| | Formulation 1 | Formulation 2 |
|---|---|---|
| Tensile strength 23° (MPa) | 9.48 | 9.74 |
| Elongation at break 23° (%) | 425 | 482 |
| 100% secant modulus 150° C. (MPa) | 0.62 | 0.67 |
| Elongation at break 150° (%) | 189 | 299 |
| Tensile strength 150° (MPa) | 1.16 | 1.55 |
| Failure time (mins) according to ASTM D 2303 involving progressive increase of stress starting at 2.5 kV with increments of 0.25 kV/hour and determination of the time to failure | >200 | >200 |

As will be observed, the sleeve produced from the linear low density polyethylene (Formulation 2) is significantly superior in all its physical properties particularly elongation at break at 150°, to that produced from the branched low density polyethylene (Formulation 1) whilst retaining the high anti-tracking property according to ASTM D 2303.

EXAMPLE 12

Wire Jacket P A formulation having the composition:
  Sclair 8405: 74.5 parts
  Timinox (antimony trioxide): 8.0 parts
  Chlorowax (Hoeschst): 16.0 parts
  Agerite Resin D (Vanderbilt): 1.5 parts
was extruded onto a heated copper conductor (110° C.) to yield a jacket having excellent insulation characteristics and particularly good mechanical properties e.g. high abrasion resistance.

EXAMPLE 13

Semi-permeable membrane

Sclair 11D was extruded as a film 0.025 mm thick under the following extrusion conditions:
  Zone 1: 140°
  Zone 2: 165°
  Zone 3: 175°
  Die: 175°
  Blow up ratio: 2.5:1

The resulting film is immersed in a solution comprising by volume 55% benzene, 5% carbon tetrachloride and 40% acrylic acid and irradiated with γ-radiation to a dosage of 0.5 Mrads at a dosage rate of 0.05 Mrads per hour. The film is washed with a 40% aqueous solution of potassium hydroxide. The resulting film is emminently suitable for use as a battery separator having an areal resistivity in 40% aqueous potassium hydroxide of 0.1 to 0.2 ohm/cm$^2$ and excellent mechanical properties, for example tensile strength.

EXAMPLE 14

Oil Resistant Blends

The following compositions were blended employing a laboratory Banbury internal mixer.
  Vamac N123 (Trade name—an ethylene/methyl acrylate elastomer available from Dupont and having a solubility parameter of 9.1): 30
  Carbon black: 2
  Antimony trioxide: 6
  Decabromodiphenylether: 12
  Crodamine IHT (Trade name—a release agent available from (Crode Ltd): 0.375
  Irganox 1010: 0.375
  Triallyl cyanurate: 1
  Whiting G400: 16
  Sclair resin: 30

The Sclair resin, Vamac N123 and Irganox 1010 were loaded into the mixer and mixed at room temperature for 1 minute. The carbon black, antimony trioxide, decabromodiphenylether and calcium carbonate were then added and mixed until temperature of the mix rose to 140°. Crodamine IHT and triallyl cyanurate were then introduced and mixed in for 45 seconds. This mix was then put onto a mill and sheeted off. Compression moulded plaques were made from the sheeted material and irradiated with an electron beam to a dosage of 12 Mrads. The plaques were tested for heat shock resistance (4 hours at 200° C.) and for resistance to ASTM Oil No. 2 and diesel oil by immersion in the fluids for 24 hours at 90°. The results are set out below. As a comparison the sclair resin is replaced by DYNH-3.

| Sclair Resin | | Physical Properties 25° C. | | Physical Properties After 4 Hours at 200° C. | | Weight Uptake % after 24 Hours at 90° C. | |
|---|---|---|---|---|---|---|---|
| Melt Index | Density at 25° C. | Tensile Strength (MPa) | Elongation % | Tensile Strength at 25° C. (MPa) | Elongation % at 25° C. | ASTM Oil No. 2 | Diesel Oil |
| 5 | 0.922 | 11.3 | 410 | 11.2 | 350 | 7.8 | 40 |
| 5 | 0.930 | 9.0 | 360 | 10.8 | 315 | 5.0 | 25 |
| 2.7 | 0.932 | 13.5 | 430 | 11.4 | 340 | 5.2 | 24 |
| 2.7 | 0.937 | 10.5 | 340 | 10.7 | 210 | 3.7 | 19 |
| 3.3 | 0.922 | 12.9 | 455 | 10.2 | 255 | 8.5 | 35 |
| DYNH-3 | | 9.6 | 385 | 9.7 | 260 | 16 | 74 |

We claim:

1. A substantially cross-linked polymeric composition comprising a first linear low density ethylene homo- or copolymer which, prior to cross-linking is characterized by (a) a density at 25° C. of less than 0.930 gm/cm$^3$, (b) a linearity expressed in terms of pendant methyl groups per 10$^3$ carbon atoms of the polymer chain of less than 30, (c) no more than 5 branches greater in length than C$_8$, and (d) a stress exponent in the range of from 1.2 to 1.4, wherein the first ethylene homo- or copolymer is present in the form of a blend with a blendable branched, ethylene homo- or copolymer, the polymers having been blended prior to cross-linking.

2. A composition according to claim 1 wherein the degree of cross-linking of the composition expressed in terms of gel content (ANSI/ASTM D 2765–68) is at least 40%.

3. A composition according to claim 1 wherein the first ethylene homo- or copolymer prior to cross-linking is characterised by a ΔT value as hereinbefore defined of greater than 15° C.

4. A composition according to claim 1 wherein the first ethylene homo- or copolymer prior to cross-linking is characterised by a molecular weight distribution index of less than 8.

5. A composition according to claim 1 wherein the first ethylene homo- or copolymer has substantially no chain branches greater in length than C$_6$.

6. A composition according to claim 5 wherein substantially all chain branches of the first ethylene homo- or copolymer are ethyl branches.

7. A composition according to claim 6 wherein the first ethylene homo- or copolymer has from 15 to 30 ethyl branches per 10$^3$ carbon atoms of the polymer chain.

8. A composition according to claim 6 wherein the first ethylene homo- or copolymer has no more than 10 ethyl branches per 10$^3$ carbon atoms of the polymer chain.

9. A composition according to claim 1 wherein the first ethylene homo- or copolymer is, prior to cross-linking, characterised by a degree of unsaturation expressed in terms of terminal vinyl groups per 10$^3$ carbon atoms of the polymer chain of at least 0.2.

10. A composition according to claim 1 wherein the first ethylene polymer is a copolymer of ethylene with an olefinically unsaturated monomer.

11. A composition according to claim 10 wherein the olefinically unsaturated monomer is a $C_3$ to $C_8$ α-olefin.

12. A composition according to claim 11 wherein the α-olefin is n-but-1-ene.

13. A composition according to claim 1 wherein the first ethylene copolymer is a random copolymer.

14. A composition according to claim 1 wherein the blendable polymer is a branched low density polyethylene or a linear high density polyethylene.

15. A composition according to claim 1 wherein the blendable polymer is an ethylene/unsaturated aliphatic ester copolymer.

16. A composition according to claim 15 wherein the ethylene/unsaturated aliphatic ester copolymer is an ethylene/vinyl acetate copolymer.

17. A composition according to claim 1 including at least 10 weight percent of a filler.

18. A composition according to claim 17 wherein the filler is a non-reinforcing filler.

19. A composition according to claim 18 wherein the filler has a particle size of from 1 to 120 microns.

20. A composition according to claim 17 wherein the filler is a reinforcing filler.

21. A composition according to claim 20 wherein the filler has a particle size of from 0.01 to 1 microns.

22. A cross-linkable composition comprising a linear low density ethylene homo- or copolymer as defined in claim 1 incorporating an effective amount of a cross-linking agent or a prorad.

23. A dimensionally recoverable article comprising a composition according to claim 1.

24. An article according to claim 23 which is heat shrinkable.

25. An article according to claim 24 which is hollow.

26. An article according to claim 25 of monolithic construction consisting wholly of the composition defined in claim 1.

27. An article according to claim 26 in the form of a sleeve.

28. Electrical insulation for a wire or cable comprising a composition according to claim 1.

29. Electrical insulation which comprises a composition according to claim 1 incorporating an anti-tracking filler and having an initial tracking voltage according to ASTM D2303 of greater than 2.5 kV.

30. A semi-conductive or conductive polymeric composition comprising a composition according to claim 1 having incorporated therein an effective amount of a conductive filler.

31. A stress grading tube for the electrical stress grading of the termination of high voltage cables comprising a semi-conductive composition according to claim 29.

32. An electrical screen for wire or cable which comprises a semi-conductive or conductive composition according to claim 29.

33. A semi-permeable membrane comprising a composition according to claim 1 in semi-permeable film form.

34. A membrane according to claim 33 wherein the film has a thickness of between 0.001 and 0.5 mm.

35. A membrane according to claim 33 wherein the film has been grafted with monomers to modify the selectivity thereof to ionic species.

36. An electrolytic cell or battery separator comprising a membrane according to claim 33.

37. A composition according to claim 1 having been quenched across the crystalline melting point thereof prior to cross-linking.

38. A substantially cross-linked polymeric composition comprising a first linear low density ethylene homo- or copolymer which, prior to cross-linking is characterized by (a) a density at 25° C. of less than 0.930 $gm/cm^3$, (b) a linearity expressed in terms of pendant methyl groups per $10^3$ carbon atoms of the polymer chain of less than 30, (c) no more than 5 branches greater in length than $C_8$, and (d) a molecular weight distribution less than 8, wherein the first ethylene homo- or copolymer is present in the form of a blend with a blendable branched, ethylene homo- or copolymer, the polymers having been blended prior to cross-linking.

39. A substantially cross-linked polymeric composition comprising a first linear low density ehtylene homo- or copolymer which, prior to cross-linking is characterized by (a) a density at 25° C. of less than 0.930 $gm/cm^3$, (b) a linearity expressed in terms of pendant methyl groups per $10^3$ carbon atoms of the polymer chain of less than 10, and (c) no more than 5 branches greater in length than $C_8$, wherein the first ethylene homo- or copolymer is present in the form of a blend with a blendable branched, ethylene homo- or copolymer, the polymers having been blended prior to cross-linking.

40. A substantially cross-linked polymeric composition comprising a linear low density ethylene homo- or copolymer which, prior to cross-linking is characterized by (a) a density at 25° C. of less than 0.930 $gm/cm^3$, (b) a linearity expressed in terms of pendant methyl groups per $10^3$ carbon atoms of the polymer chain of from 15 to 30, and (c) no more than 5 branches greater in length than $C_8$, wherein the first ethylene homo- or copolymer is present in the form of a blend with a blendable branched, ethylene homo- or copolymer, the polymers having been blended prior to cross-linking.

* * * * *